United States Patent [19]

Lechner

[11] 4,180,914
[45] Jan. 1, 1980

[54] SELF-LOCKING TELESCOPIC EXTENSIBLE RULE

[76] Inventor: Helmut Lechner, Forellenweg 1, 3590 Bad Wildungen-Wega, Fed. Rep. of Germany

[21] Appl. No.: 911,215

[22] Filed: May 31, 1978

[30] Foreign Application Priority Data

Jun. 3, 1977 [DE] Fed. Rep. of Germany ....... 2725113

[51] Int. Cl.² ............................................. G01B 3/08
[52] U.S. Cl. .................................................... 33/161
[58] Field of Search ............. 33/161, 105, 106, 107 R, 33/111

[56] References Cited

U.S. PATENT DOCUMENTS

| 224,401 | 2/1880 | Derickson | 33/161 |
|---|---|---|---|
| 2,740,201 | 4/1956 | Swanson | 33/161 |
| 3,104,477 | 9/1963 | Edwill | 33/161 |
| 3,261,102 | 7/1966 | Stedman | 33/161 |
| 3,492,737 | 2/1970 | Swanson | 33/161 |

*Primary Examiner*—Richard R. Stearns
*Attorney, Agent, or Firm*—Max Fogiel

[57] ABSTRACT

A length-measuring instrument having at least two tubes which are telescopically extensible. Each of the tubes is provided with a scale graduation arranged so that the scale graduation on an inner tube proceeds numerically in a direction opposite to the scale graduation on an outer one of the tubes. A fixing device acts in any position of the tubes and functions as an automatic clamp having two spring-loaded clamping pins passing through the outer one of the tubes and arranged in an inclined position. These clamping pins rest in each fixed position of the tubes, against an upper side of the inner tube carrying the scale graduation. The clamping effect may be released only by applying external force to the clamp.

5 Claims, 10 Drawing Figures

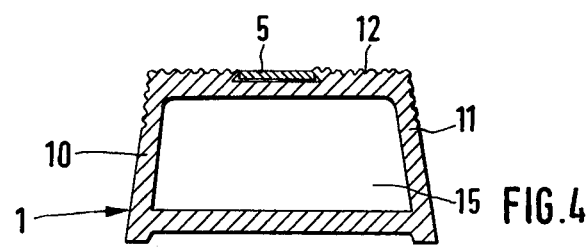
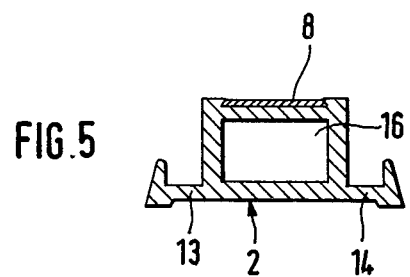
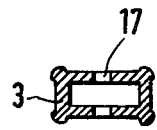
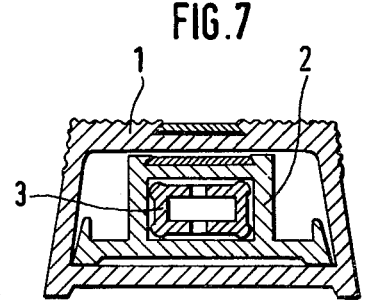

SELF-LOCKING TELESCOPIC EXTENSIBLE RULE

BACKGROUND OF THE INVENTION

The invention relates to a length-measuring instrument formed by at least two tubes which can be drawn out telescopically, which has a fixing device acting in any position of the tubes, however far drawn out, and, on each of the tubes, a scale, the continuation of which on an inner tube is arranged in the opposite direction to the scale on the stand tube arranged on the outside.

A length-measuring instrument of this type is known from U.S. Pat. No. 3,492,737. Several telescopic tubes which can be pushed inside one another are used in this instrument. Each of the telescopic tubes carries a scale which is visible from the outside. On some of the telescopic tubes, the scale increases, and on the other telescopic tubes the scale is arranged in the opposite direction, that is to say it decreases. The outer stand tube carries on its upper end a fixing device for the tubes which can be drawn out, which device can act in any position, however far drawn out. For this it is necessary to change the fixing device into the clamping position by turning a screw manually. Furthermore, each two telescopic tubes adjacent in the draw-out sequence can be coupled in their completely drawn-out position, in each case by a catching device. For this, a spring-loaded bolt enters into a corresponding recess in the other telescopic tube, so that both tubes are fixed in this completely drawn-out position. This known length-measuring instrument is not designed or intended as a supporting instrument. However, if it is employed as a supporting instrument, the disadvantage arises that the fixing device, which is provided at the upper end of the outer stand tube, must always be operated manually, and in fact both to bring it into the clamping position and into the release position. This manual operation requires that the, or at least one, operator remains within grasping range of the fixing device when the work concerned is being carried out.

A further length-measuring instrument is known from Swiss Pat. No. 39,945. Three tubes which can be slid telescopically inside one another are used in this instrument, each of the tubes again carrying a scale. The scale increases on the outer stand tube. The scale is arranged in the opposite direction on the two draw-out tubes, that is to say it decreases. This length-measuring instrument also has a fixing device. However, this acts exclusively in the completely drawn-out position of two adjacent tubes. Intermediate positions cannot be fixed. For this reason, this length-measuring instrument cannot be used as a supporting instrument.

The invention is based on the object of providing a length-measuring instrument of the type initially described, which can be employed in many ways by the craftsman in the work he has to carry out. Not only should the instrument permit as simple and reliable as possible a reading of linear measures, such as customarily occur, but it should also be possible to use it as a supporting instrument, for example for supporting curtain rails, light fittings, false ceilings and the like to be mounted on the ceiling of a room.

SUMMARY OF THE INVENTION

The length-measuring instrument is characterised, according to the invention, in that the fixing device is constructed as the clamping device automatically providing the clamping action in any position of the tubes, however far drawn out, and can only be changed into the release position for the tubes by means of external application of force. Various advantages are achieved by the fact that the clamping device automatically provides the clamping action when the tubes have been drawn out as far as desired and the sliding of the tubes relative to one another has ended. The main advantage is that it becomes possible to use the length-measuring instrument as a supporting instrument when the instrument must be individually adapted to the required support height. For example, the draw-out tube of the instrument can be drawn out from a ladder in order, for example, to support a curtain rail on the ceiling of a room. The locking together of the two tubes in this position takes place automatically without it being necessary for the operator to climb down from the ladder and at the same time hold the individual tubes firmly in order then to operate manually the fixing device at the upper end of the stand tube. The clamping device is also advantageous when carrying out a length measurement, namely by the fact that the measurement taken remains held in a non-displaceable manner, even after climbing down from a ladder or the like, until the clamping device is released. The reliability of the reading is thus improved. In addition, the stand tube can also be used as a ruler for simple diagrammatic representations or as a cutting template, for example for resting the cutting knife on when laying carpeting.

The clamping device preferably consists of two spring-loaded clamping pins passing through the stand tube and arranged in an inclined position, which, in each fixed position, rest against the surface of the draw-out tube carrying the scale. A clamping device constructed in this manner is exceptionally effective. For example, the draw-out tube can also be drawn out of the stand tube, placed on the floor, by an operator standing on a ladder, and can be extended up to the ceiling of the room, the clamping device acting immediately, as a result of the spring-loading, after the draw-out tube has been released. The action of the clamping device can be cancelled by tilting the clamping pins, so that the draw-out tube can be pushed backwards again into the strand tube.

The fixed position is achieved in the direction of gravity, that is to say the tube can be drawn out from any position without operating the clamping device and can then only be pushed in if the clamping action is cancelled during the pushing-in operation. The clamping pins can appropriately be operated together by means of a bow. The handling is thereby made considerably easier.

The clamping pins of the clamping device are appropriately arranged in an inclined position at an angle of about 22°. This has proved to be the optimum angle, with respect to the frictional properties of the clamping device. In addition to the clamping device, a fixing device, in particular a fixing screw, can also be arranged between the stand tube and the draw-out tube. This fixing device is appropriate, in order to prevent the tubes from sliding together, for example, in particular in the case of a relatively rather large load to be supported, or to lock a measurement set as desired, in order to transfer it elsewhere.

BRIEF DESCRIPTION OF THE DRAWINGS

The invention is further described with the aid of a preferred embodiment. In the drawings:

FIG. 4 shows a cross-section through the stand tube, FIG. 5 shows a cross-section through the draw-out tube, FIG. 6 shows a cross-section through the extension tube, FIG. 7 shows a cross-section through the three tubes in the pushed-together state.

DESCRIPTION OF THE PREFERRED EMBODIMENTS

Figure 1:
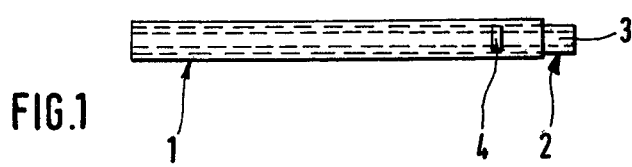
FIG. 1 shows a side view of the device, in a highly schematic manner.
Figure 2:
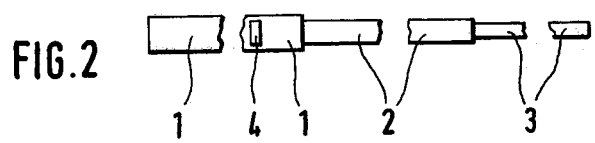
FIG. 2 shows the device in the drawn-out state.

The length-measuring instrument is represented schematically in FIG. 1. The outer stand tube 1 in which the draw-out tube 2 is positioned can be seen. The extension tube 3 is indicated in the draw-out tube 2. The draw-out tube 2 and extension tube 3 are somewhat longer than the stand tube 1, so that these are still guided in each case, even when drawn out very far. The clamping device 4, which acts between the stand tube 1 and the draw-out tube 2, is provided, in the region shown, on the stand tube 1. The clamping device 4 can be applied in an infinitely variable manner.

Figure 3:
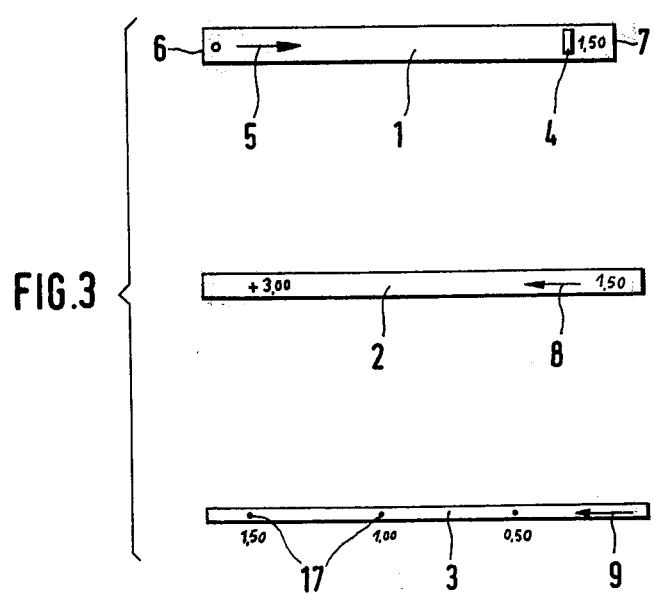
FIG. 3 shows an individual representation of the three tubes of the device, with the scale indicated schematically.

FIG. 3 again shows the individual tubes with the scales applied to them. The stand tube 1 has a length of 1.5 exactly. It is provided with a scale, that is to say a measuring band 5, which runs in an increasing and continuous manner from the start 6 of the stand tube 1 to the end 7 of the stand tube 1. The draw-out tube 2 also has a scale 8, which, however, is arranged in the opposite direction and continues the scale 5, that is to say starts with the measurement of 1.50 m and ends at the measurement of 3 m. However, at this point, the start of the draw-out tube 2 has not yet been reached. The draw-out tube 2 has a length of about 1.60 m. The extension tube 3, which is provided with only a rough scale 9, also has the same length. Three measuring points, 0.5 m, 1.0 m and 1.5 m, which can be constructed as bores, a bolt or a pin belonging to these, are sufficient, for example, to fix the extension tube relative to the draw-out tube.

FIG. 4 shows a cross-section through the stand tube 1. It can be seen that an essentially rectangular cross-section is provided, in order also to achieve adequate rigidity of the instrument and torsional rigidity. The scale 5 is inserted on the upper side. On the lower side, the stand tube 1 has a somewhat hollow construction in order to achieve better support of the arms 10 and 11 of the profile of the stand tube, or of their free ends, constructed as bosses, on a flat surface. Furthermore, the arms 10 and 11 are arranged in a slightly inclined position so that the stand tube can be used, for example, as a ruler for carrying out drawing or marking work. It is also possible to guide a knife along the stand tube, for example when cutting carpeting. A fluting 12 is provided in the region of the upper side in order to improve holding of the stand tube. The stand tube 1 itself consists of an extruded aluminium profile.

FIG. 5 shows an analogous cross-section through the draw-out tube 2. This tube also has two arms 13 and 14 and its shape is designed so that it fits into the interior 15 of the stand tube 1. Its upper side contains the scale 8. The scales 5 and 8 can also be arranged doubly, and in that case in opposite directions, in order that the scales can be read more easily for special cases of application.

The extension tube 3, the cross-section of which can be seen from FIG. 6, is accommodated in the interior 16 of the draw-out tube 2. As already described, the extension tube 3 has openings 17, with the aid of which it can be fitted relative to the draw-out tube 2.

FIG. 7 shows how the individual tubes, namely the stand tube 1, the draw-out tube 2 and the extension tube 3, are matched to one another and pass telescopically inside one another.

Figure 8:
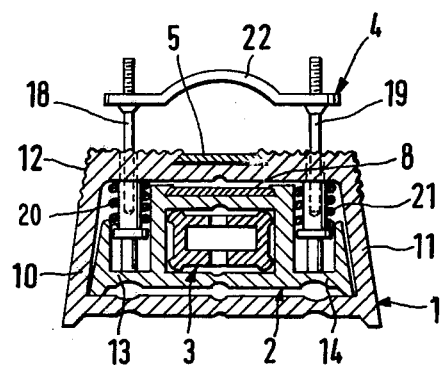
FIG. 8 shows a cross-section through the tubes, with a representation of the clamping device.
Figure 9:
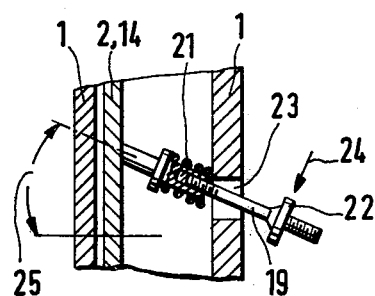
FIG. 9 shows a side view of the clamping device and FIG. 10 shows the arrangement and position of a hinged angle piece at the start of the stand tube.

FIG. 8 essentially shows the clamping device 4, which possesses the two clamping pins 18 and 19, which are arranged somewhat to the side of the scale 5 and lie with their tips on the arms 13 and 14 of the draw-out tube 2. Springs 20, 21 are arranged around the clamping pins 18 and 19 and force the clamping pins into the clamping position. At the free rear end, the two clamping pins 18 and 19 are connected by the bow 22, which permits mutual operation. This can best be seen from FIG. 9, which also shows the inclined position. The clamping pins 18 and 19 pass through holes 23 in the stand tube 1 and lie with their bevelled tips against the arms 13 and 14 of the draw-out tube 2. By applying pressure to the bow 22 in the direction of the arrow 24, the two clamping pins 18 and 19 can be swivelled slightly so that the draw-out tube 2 is released from the clamping action and, for example, slides back by itself into the stand tube 1 in the direction of gravity and under the influence of gravity. The action of the clamping device 4 is infinitely variable in any position. When the draw-out operation has ended and no external force is applied to the bow 22, the clamping action occurs immediately. The pitch angle 25 of the clamping pins 18 and 19 is about 22°. The clamping device with the bow 22 can be surrounded by a protective housing, not shown, which possesses some openings for operating purposes, in order to prevent undesired operation of and damage to the clamping device if, for example, the length-measuring instrument falls from a supporting position.

Figure 10:
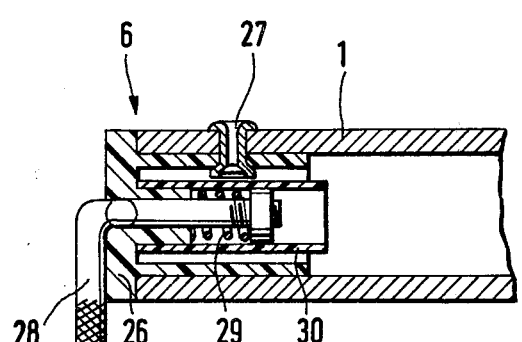

As can be seen from FIG. 10, a cap 26, which can consist, for example, of plastic, is arranged at the start 6 of the stand tube 1. This cap is connected to the stand tube 1 by means of a blind rivet 27, the fixing of the scale 5 being simultaneously achieved with this rivet. A supporting angle piece 28 is located in the cap 26 in a manner such that it can be lowered and swivelled, and is supported on the spring 29 and otherwise can be swivelled out, as is represented by the continuous lines. However, it can also be swivelled in the lowered position, as the dotted line indicates. Inside the stand tube 1, the cap 26 at the same time possesses a damping device 29, which is constructed, for example, in the form of a spring or an elastic buffer. This damping device serves to receive the draw-out tube 2 and/or the extension tube 3 when these are pushed into the stand tube 1.

A cap, which can be of similar construction to the cap 26, is also appropriately provided at the free end of the extension tube 3.

I claim:

1. A length-measuring instrument comprising: at least two tubes extensible telescopically; fixing means acting in any position of said tubes; scale graduation means on each one of said tubes, the scale graduation means on an inner one of said tubes proceeding numerically in a direction opposite to the scale graduation means on an outer one of said tubes, said fixing means comprising automatic clamping means with two spring-loaded clamping pins passing through said outer one of said tubes and arranged in an inclined position, said clamping pins resting in each fixed position of said tubes against an upper surface of said inner one of said tubes carrying said scale graduation means, release from clamping being attainable by applying external force to said clamping means for retraction of said inner one of said tubes, said inner one of said tubes being extendable without applying external force to release said clamping means.

2. A length-measuring instrument as defined in claim 1 and comprising support means for ceiling mounted objects, a fixed position being achieved in a vertical direction of said instrument.

3. A length-measuring instrument as defined in claim 1 wherein said clamping pins are linked by a connecting member for joint actuation.

4. A length-measuring instrument as defined in claim 3 wherein said connecting member comprises further a bow-shaped member.

5. A length-measuring instrument as defined in claim 1 wherein said clamping pins are inclined at an angle of 22° with the horizontal when said instrument is vertically oriented.

* * * * *